US 6,658,873 B2

(12) United States Patent
Clarke et al.

(10) Patent No.: US 6,658,873 B2
(45) Date of Patent: Dec. 9, 2003

(54) AIR CYCLE COOLING SYSTEM

(75) Inventors: John Alistair Clarke, Somerset (GB); Bernard Francis, Somerset (GB)

(73) Assignee: Honeywell Normalair-Garrett Limited, Yeovil (GB)

( * ) Notice: Subject to any disclaimer, the term of this patent is extended or adjusted under 35 U.S.C. 154(b) by 0 days.

(21) Appl. No.: 10/202,262

(22) Filed: Jul. 24, 2002

(65) Prior Publication Data

US 2003/0019237 A1 Jan. 30, 2003

(30) Foreign Application Priority Data

Jul. 27, 2001 (GB) .............................................. 0118292

(51) Int. Cl.[7] .............................. F25B 9/00; F25B 1/00; F25D 9/00
(52) U.S. Cl. .............................. 62/172; 62/498; 62/402
(58) Field of Search .......................... 62/402, 498, 401, 62/79, 87, 172

(56) References Cited

U.S. PATENT DOCUMENTS

| 4,523,517 A | 6/1985 | Cronin ........................... 98/1.5 |
| 4,966,005 A | 10/1990 | Cowell et al. .................. 62/79 |
| 5,343,692 A | * 9/1994 | Thomson et al. .............. 60/785 |
| 5,906,111 A | * 5/1999 | Lui ............................. 62/402 |
| 6,457,318 B1 | * 10/2002 | Lui et al. ........................ 62/87 |

FOREIGN PATENT DOCUMENTS

| EP | 0581237 A1 | 2/1994 |
| EP | 0738655 A3 | 10/1996 |
| EP | 0940336 A2 | 9/1999 |

* cited by examiner

Primary Examiner—Chen Wen Jiang
(74) Attorney, Agent, or Firm—MacMillan, Sobanski & Todd, LLC

(57) ABSTRACT

An air cycle cooling system for cooling a first heat load and a second heat load, the system including a compressor to pressurise air in the system, and an expansion apparatus for allowing the compressed air to expand and cool for use in cooling the first and second heat loads, and wherein at least a proportion of the air utilised for cooling the first heat load is recycled to the compressor and at least a proportion of the air utilised for cooling the second heat load is utilised as a coolant in a primary heat exchanger to cool the air from the first heat load prior to the air from the first heat load being expanded in the expansion apparatus.

16 Claims, 2 Drawing Sheets

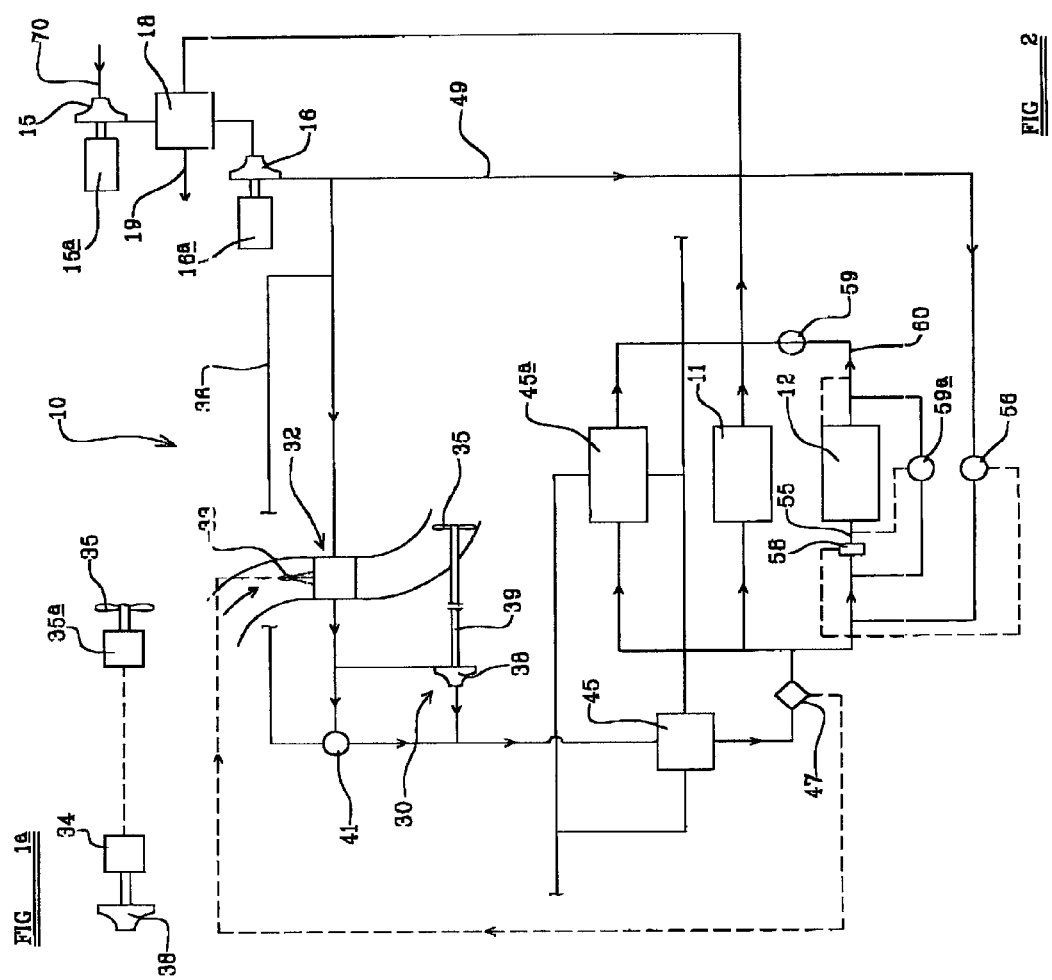

AIR CYCLE COOLING SYSTEM

BACKGROUND OF THE INVENTION

This invention relates to an air cycle cooling system and more particularly but not exclusively to an air cycle cooling system for use in cooling a heat load such as that produced in an aircraft by the operation of avionics equipment and/or radar equipment or other electrically operated apparatus, and/or a heat load produced in an aircrew enclosure, i.e. for air conditioning.

Air cycle air conditioning is widely used in aircraft to provide conditioned air whilst taking advantage of a supply of pressurised air bled from an aircraft engine, known as bleed air. However in modem high performance aircraft for example, engines are being designed to be increasingly fuel efficient and as a result less pressurised bleed air is available for ancillary systems such as for an air cycle cooling system. Accordingly in such an air cycle cooling system there is a requirement to reduce dependence on engine bleed air as a source of pressurised air.

SUMMARY OF THE INVENTION

According to a first aspect of the invention we provide an air cycle cooling system for cooling a first heat load and a second heat load, the system including a compressor to pressurise air in the system, and an expansion apparatus for allowing the compressed air to expand and cool for use in cooling the first and second heat loads, and wherein at least a proportion of the air utilised for cooling the first heat load is recycled to the compressor and at least a proportion of the air utilised for cooling the second heat load is utilised as a coolant in a primary heat exchanger to cool the air from the first heat load prior to the air from the first heat load being expanded in the expansion apparatus.

Utilising an air cycle cooling system in accordance with the invention for cooling first and second heat loads in an aircraft, dependence upon engine bleed air as a source of pressurised air may be reduced whilst a simple yet effective and energy efficient system may be provided.

The compressor may include first and second compressor stages, each compressor stage including a compressor wheel, and the primary heat exchanger may be positioned between the first and second compressor stages so that the air from the first heat load which is cooled by the air from the second heat load is pre-compressed by the first compressor stage.

In one arrangement the compressor wheels are driven by a common electric motor and thus the compressor wheels may be carried on a common drive shaft. In another arrangement, individual electric motors may be provided for driving the compressor wheels of the first and second compressor stages.

The system may include a fan for assisting cooling of the pressurised air prior to feeding the pressurised air to the expansion apparatus.

Further to improve the efficiency of the system of the invention, energy recovered from the pressurised air supply in the expansion apparatus may be utilised to provide power to drive at least one of the electric motor or motors for driving the compressor, and the fan. For example the recovered energy may be utilised to drive a power generator for driving at least one of the compressor and the fan.

The cooling system may in one embodiment be an at least partially closed loop system in which at least some of the air which has been utilised for cooling the heat load is subsequently recycled to the compressor for re-pressurisation. In such an arrangement an auxiliary pressurised air supply would be required to make up air lost from the system.

Such auxiliary pressurised air may be pre-cooled prior to mixing with re-pressurised air from the compressor, for example in a pre-cooling heat exchanger, in which the auxiliary air may be pre-cooled by exchanging heat with a coolant being air. For example, where the system is provided in an aircraft, the coolant may be ram air, that is air which is induced to flow into the heat exchanger, by the movement of the aircraft through the air, and/or air at ambient temperature.

In an aircraft, such an auxiliary pressurised air supply may be engine bleed air. However, only a relatively small amount of engine bleed air would be required for such make-up purposes and accordingly the requirement to reduce dependence on engine bleed air as a source of pressurised air, may still be satisfied.

Whether the auxiliary pressurised air supply is engine bleed air or another source of pressurised air, preferably the auxiliary air and the re-pressurised recycled air from the compressor are mixed and cooled prior to expansion and cooling in the expansion apparatus, for example by cooling the auxiliary and recycled air in a secondary heat exchanger. Heat in the auxiliary and recycled air may be exchanged with a coolant in the secondary heat exchanger, such coolant including air for example ram air and/or air at ambient temperature. The coolant air may be induced to flow through the secondary heat exchanger by the fan where operative, or where the system is in an aircraft, by the movement of the aircraft through the air.

The invention has been developed particularly but not exclusively for providing cooling of first and second heat loads in an aircraft. Thus the heat load may include a first heat load produced by for example, an electrically operated apparatus such as avionics equipment and/or radar equipment in an aircraft and a second heat load produced in an aircrew or passenger enclosure.

In each case of an at least partially closed or open loop system, where the heat load includes a heat load produced in an aircrew or passenger enclosure, a hot air supply may be made available to the aircrew or passenger enclosure when heating of the enclosure is required, for example hot compressed air from the compressor. Moreover in each case of an at least partially closed or open loop system, a water separator may be provided to separate water from the air expanded and cooled in the expansion apparatus. Such water may be utilised for assisting cooling of the pressurised air prior to expansion and cooling in the expansion apparatus. For example such water may be sprayed into the air coolant in the secondary heat exchanger where provided, to improve the efficiency of cooling in the secondary heat exchanger.

According to a second aspect of the invention we provide an air cycle cooling system for cooling a heat load, the system including a compressor to pressurise an air supply, and an expansion apparatus for allowing the compressed air to expand and cool for use in cooling the heat load, and wherein the compressor is electrically driven by a motor, and the system further includes at least one of a fan for assisting cooling of the pressurised air prior to feeding the pressurised air to the expansion apparatus, and a power generator for generating power for assisting driving the compressor or a fan, the fan and/or the power generator being driven by energy recovered from the pressurised air supply in the expansion apparatus, the system being a partially closed system in which at least some of the air which has been utilised for cooling the heat load is recycled to the compressor for re-pressurisation.

According to a third aspect of the invention we provide an air cycle cooling system for cooling a heat load, the system including a compressor to pressurise an air supply, and an expansion apparatus for allowing the compressed air to expand and cool for use in cooling the heat load, and wherein the compressor is electrically driven by a motor, and the system further includes at least one of a fan for assisting cooling of the pressurised air prior to feeding the pressurised air to the expansion apparatus, and a power generator for generating power for assisting driving the compressor or a fan, the fan and/or the power generator being driven by energy recovered from the pressurised air supply in the expansion apparatus, the system being an open loop system in which at least a proportion of the air utilised for cooling the heat load is discharged from the system subsequently to being utilised for cooling air to be fed to the expansion apparatus.

The system of the second or third aspect of the invention may have any of the features of the system of the first aspect of the invention.

According to a fourth aspect of the invention we provide a method of operating an air cycle cooling system for cooling a heat load, the system including a compressor to pressurise an air supply, and an expansion apparatus for allowing the compressed air to expand and cool for use in cooling the heat load, and wherein the method includes driving the compressor electrically by a motor, and recovering energy from the pressurised air supply in the expansion apparatus and using the recovered energy for one of driving a fan for assisting cooling of the pressurised air prior to feeding the pressurised air to the expansion apparatus and driving a power generator for generating power for assisting driving the compressor or a fan.

The method of the fourth aspect of the invention may utilise an air cycle cooling system having any of the features of the first, second or third aspects of the invention.

BRIEF DESCRIPTION OF THE DRAWINGS

Embodiments of the invention will now be described with reference to the accompanying drawings in which:

FIG. 1a is an illustrative view of part of the apparatus of FIG. 1 but modified;

FIG. 2 is a schematic view of a first embodiment of an air cycle cooling system according to the third aspect of the invention;

FIG. 2a is an illustrative view of part of the apparatus of FIG. 1 or FIG. 2 but modified.

Figure 1:
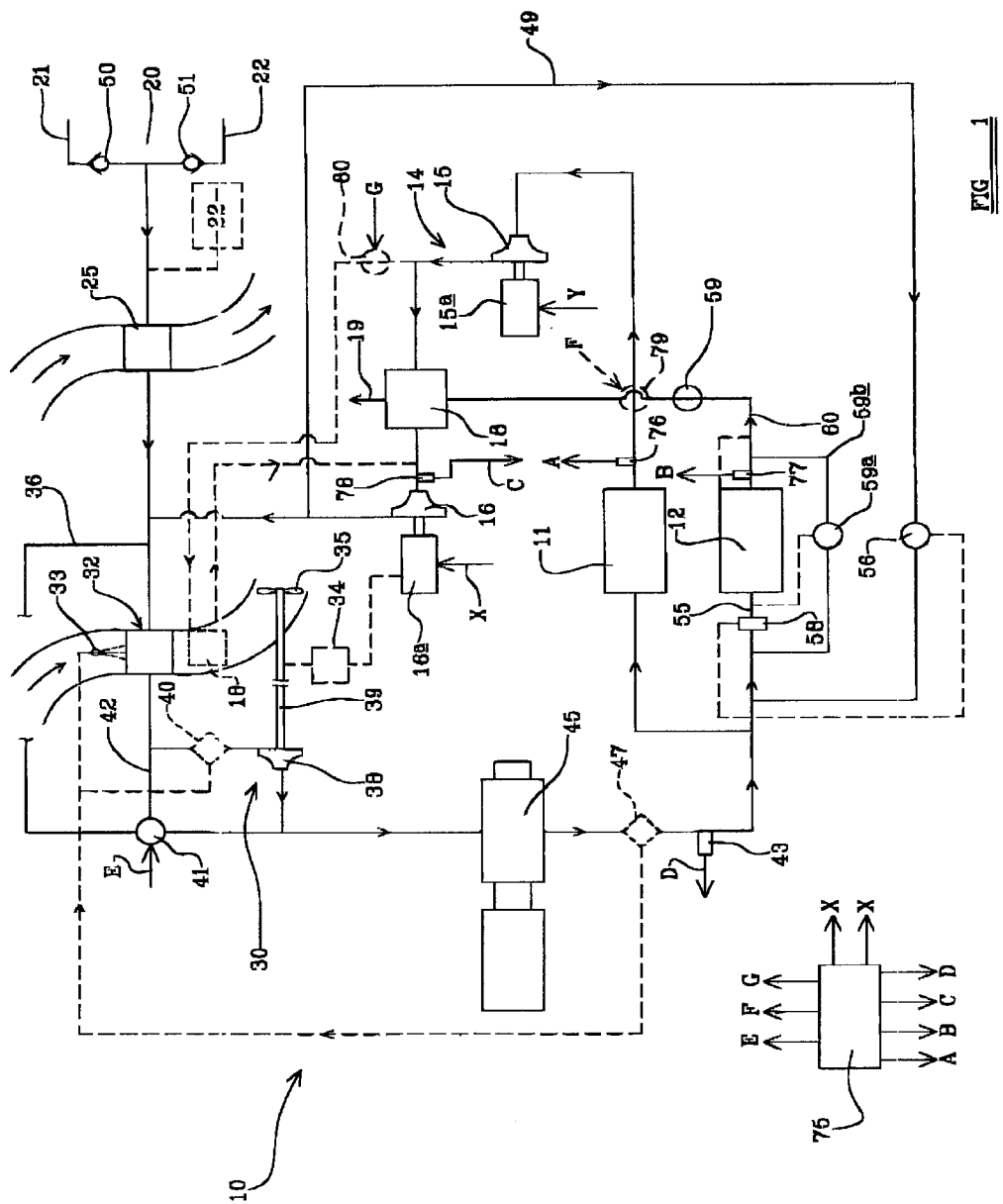
FIG. 1 is a schematic view of a first embodiment of an air cycle cooling system according to the first aspect of the invention.

Referring first to FIG. 1 there is shown schematically an air cycle cooling system 10 in accordance with the invention. The system 10 is for use in an aircraft, for cooling a heat load which includes a first heat load 11 being that produced by the operation of electrical apparatus such as avionics and/or radar equipment for examples only, which generate substantial heat in operation, and a second heat load 12 being that produced in an aircrew, and/or passenger, enclosure of the aircraft.

The avionics/radar equipment may be contained in a pod or other enclosure 11 to which cooling air is provided to cool the equipment, and cooling air may be provided by the system 10 in use to the aircrew enclosure 12 to keep the aircrew cool. Also as described below, there is a hot air supply which may be provided to the aircrew enclosure 12, and thus the temperature in the aircrew enclosure may be maintained within acceptable limits in hot or cold ambient conditions.

In this example, the system 10 is a partially closed system in that at least some of the air used for cooling is recycled system air. Air which has been utilised for cooling at least the avionics/radar equipment 11 is fed to a compressor 14. The compressor 14 is a two stage compressor, each stage including a compressor wheel 15 or 16 which are each driven by respective electric motors 15a, 16a. The electric motors 15a, 16a may be of the same or different capacity as required to enable a required degree of pressurisation to be achieved by the respective compressor stages.

Air which is compressed by the compressor wheel 15 in the first compressor stage will gain heat as a result of being compressed and in this embodiment is cooled prior to being fed to the second compressor stage for further compression by the second compressor wheel 16.

This cooling between the first and second compressor stages is achieved in a primary heat exchanger 18 where heat in the compressed air is exchanged to a coolant which in this example is air which has been utilised for cooling the aircrew enclosure heat load 12. It will be appreciated that the air which has been utilised for cooling the aircrew enclosure 12 may be substantially cooler than the air which has been used for cooling the avionics/radar equipment 11 and then compressed in the first compressor stage, at least usually. In another example, or at least under some operating conditions, air which has been used for cooling the avionics/radar equipment 11 may be cooler than the aircrew enclosure cooling air. Thus, as described in more detail below, a change-over valve 79 may be provided to reverse the flows of air from the equipment 11 and enclosure 12, so that in the event that the air from the enclosure 12 is hotter than the air from the equipment 11, the air from the equipment may be used as a coolant in the primary heat exchanger 18 to cool the air from the enclosure 12. In yet another example, a proportion of one or both of the air flows from the respective heat loads 11, 12 may be used for cooling the remaining or at least a proportion of the remaining air from the heat loads 11, 12.

The primary heat exchanger 18 may be a so called cross flow heat exchanger as drawn, or any other heat exchanger which permits heat to be exchanged to the coolant. After being used as coolant in the primary heat exchanger 18, the air which had been utilised for cooling the first heat load 11 i.e. the avionics and radar equipment, is exhausted in this partially closed system example, as indicated at 19.

The now cooled compressed air is then fed from the primary heat exchanger 18 to the second compressor wheel 16 of the second compressor stage of the compressor 14 for further compression. Such further compression will again result in heating of the air.

By virtue of the coolant air which is exhausted at exhaust 19 after passing through the primary heat exchanger 18, some air will be lost from the system 10. To make up for this loss of air, there is provided an auxiliary pressurised air supply 20. When the aircraft is in flight and its engine(s) are operating normally, high pressure air may be bled from the engine to provide the auxiliary supply, as indicated in the drawing at 21. When the aircraft is on the ground with its engine(s) not working, an auxiliary pressurised air supply may be provided by a ground based power unit as indicated at 22 in the drawings.

Particularly in the case of the auxiliary pressurised air being engine bleed air, this supply may be hot and thus require pre-cooling before being introduced into the cooling system 10. This may be achieved using a pre-cooling heat exchanger 25 in which the hot air may exchange heat with a coolant being in this example ram air, that is, air which is forced through the pre-cooling heat exchanger 25 due to the motion of the aircraft through the air. Again the pre-cooling heat exchanger 25 may be of the cross flow or other type.

When the aircraft is on the ground and ram air is unavailable, the ground based power unit 22 may be arranged to supply auxiliary air which is cool enough for introduction into the system 10.

The hot recycled air from the compressor 14 and the auxiliary air from supply 20 are mixed and fed together to an expansion apparatus 30. Preferably though, before passing to the expansion apparatus 30, the recycled and auxiliary air mixture is cooled, for example by passing through a secondary heat exchanger 32 where again, heat may be exchanged with a coolant, which in the present example is again ram air or air at ambient temperature.

As indicated in dotted lines, if desired, the primary heat exchanger 18 between the first and second compressor stages, may be located adjacent to the secondary heat exchanger 32 so that the coolant for the primary heat exchanger 18 is ram air rather than or addition to air which has been utilised for cooling the aircrew enclosure 12. Thus the embodiment of FIG. 1 may be adapted where the heat load to be cooled by the system 10 does not include an aircrew enclosure 12 or where it is not desired to use the air which has been utilised for cooling the aircrew enclosure 12 as a coolant in the primary heat exchanger 18.

In any event, if desired, the primary heat exchanger 18 may included two or more parallel or in-series stages, for example one stage being positioned as indicated in fall lines in the drawing, and the other where indicated in dotted lines in the drawings, or elsewhere as desired.

To assist cooling of the recycled and auxiliary air mixture in the secondary heat exchanger 32, water may be sprayed into the ram air as indicated as 33, the water supply being obtained as hereinafter explained, and also to assist cooling particularly at low airspeeds or when the aircraft is on the ground, a fan 35 is used to induce the ram air through the secondary heat exchanger 32 (and the primary heat exchanger 18 where positioned as indicated in dotted lines in the ram air flow).

The air which has been cooled in the secondary heat exchanger 32 will still be warm. The warm air from the secondary heat exchanger 32 is then fed to the expansion apparatus 30 which includes an expansion turbine 38. There the air is substantially cooled and thus may be used for cooling as described below.

In the example shown in FIG. 1, the fan 35 for inducing the ram air through the secondary heat exchanger 32 and thus assisting cooling, is carried on a shaft 39 which is mechanically drivable by the energy recovered from the compressed air as the compressed air expands over the turbine 38. The turbine 38 and fan 35 may be carried on a common shaft 39, although preferably a clutch is provided to enable the fan 35 to be disconnected. However any other transmission arrangement which permits the turbine 38 mechanically to drive the fan 35 may be provided.

Additionally or alternatively to driving a fan 35, the energy recovered from the hot compressed air as it expands and cools, my otherwise be used, for example for driving an electrical generator 34 as schematically indicated in FIG. 1 in dotted lines, and as shown more clearly in FIG. 1$a_1$. The electricity generated may be stored in a battery for example, or immediately used, as a supply to assist driving the electric motor or motors 15$a$, 16$a$ of the compressor 14, or for any other purpose which requires an electric supply. If desired, instead of a mechanical connection between the turbine 38 and fan 35, the turbine 38 may drive the generator 34 which may then provide an electric supply to a motor 35$a$ to drive fan 35, as indicated in FIG. 1$a$.

It is envisaged that in a first mode of operation, e.g. when the aircraft is on the ground or at least at low airspeeds such that operation of the fan 35 is desirable to induce ram air through the secondary heat exchanger 32, a mechanical or electronic clutch may be operated to enable the fan 35 to be driven mechanically or by the motor 35$a$. At higher airspeeds when it is unnecessary to induce ram air flow with the aid of the fan 35, the clutch may be disconnected, and the generator 34 connected or the electrical output from the generator 34 diverted from the fan motor 35$a$, to assist in powering the motor or motors 15$a$, 16$a$ of the compressor 14, in a second mode of operation.

If desired, particularly where the secondary heat exchanger 32 is efficient at cooling, water may become separated out of the air. Thus if necessary a high pressure water separator 40 may be provided between the secondary heat exchanger 18 and the expansion apparatus 30, and the thus separated water may be used for spraying into the ram air stream at 33 for aiding cooling in the secondary heat exchanger 32.

A three way temperature control valve 41 may be provided which may be controlled by a controller 75 (described in more detail below) depending for example on the temperature of the cooled and expanded air sensed e.g. by a temperature sensor, such as indicated at 43, downstream of the expansion apparatus 30. The three way valve 41 may enable mixing of the cold air from the expansion apparatus 30, with a proportion of hot air from upstream of the secondary heat exchanger 32 fed along a by-pass loop 36, and a proportion of warm air from the secondary heat exchanger 32 via a further by-pass loop 42, in order to achieve a desired temperature for the cooling air, irrespective of prevailing conditions.

The cooled and expanded air from the expansion apparatus 30, plus any by-pass air, may be used for any desired cooling purposes. As indicated in FIG. 1, a liquid, such as hydraulic oil may be cooled in a liquid load heat exchanger 45 where at least a portion of the cooling air may thermally contact the oil to remove heat from the oil, but any other liquid or fluid of any aircraft system may be cooled, such as for example a glycol/water mixture which may be used for supplementary cooling of any electrically operated apparatus.

Any water separated out of the air in the expansion apparatus 30 may be removed by a low pressure water separator as indicated at 47, and such removed water may again be used for spraying at 33 into the ram air flowing through the secondary heat exchanger 32.

The cooling air may then be used for its primary purpose for cooling the avionics/radar equipment 11 and the aircrew enclosure 12, before being recycled at least in part, as described above.

Further features of the system 10 are as follows.

One way valves 50 and 51 are provided to prevent the back flow of auxiliary air from the system 10 into the engine auxiliary air supply 21 of ground based power unit supply 22 respectively.

To make available to the aircrew enclosure 12 a supply of hot air which may be mixed with cool air as necessary to achieve a desired aircrew enclosure 12 temperature, a feedback loop 49 is provided for a proportion of hot air from the compressor 14, to an inlet 55 to the aircrew enclosure. A temperature control valve 56 may be provided to control the amount of hot air to be introduced into inlet 55, depending on the response of an aircrew enclosure temperature sensor 58. Also, to keep the aircrew enclosure 12 pressure within acceptable limits, a cabin pressure valve 59 is provided in an outlet 60 for the air which has been utilised for cooling the aircrew enclosure 12, and pressure equalisation valve 59a is provided in a by-pass loop 59b. Thus as the aircraft climbs and descends, the cabin pressure valve 59 and equalisation valve 59a may control the flow of air to and from the aircrew enclosure 12 thus to preserve a desired pressure range in the enclosure 12.

In this example, the controller 75 receives various inputs A to D from sensors 76, 77, 78, 43 in the system, and provides outputs E, F and G to valves 41, 79 and 80 and outputs X and Y to the motors 16a, 15a which drive the compressor wheels 16 and 15. The controller operates the valves 41, 79, 80 and motors 16a, 15a according to an algorithm according to prevailing conditions such as aircraft height and ambient temperature.

Thus a desired proportion of warm air may by-pass the expansion turbine 38 by opening by-pass valve 41 as described above, in order to achieve a desired temperature/pressure of cooling air for feeding to the heat loads 11, 12.

The airflows from the two heat loads 11 and 12 may be swapped or mixed so that a desired air flow at a desired temperature may be provided for use as a coolant in the primary heat exchanger whilst for example maintaining the temperature of air in the aircrew enclosure 12 within acceptable limits, by the controller 75 appropriately operating the change-over valve 79.

Where the primary heat exchanger 18 includes a stage located in the ram air flow as indicated in dotted lines, the proportion of pre-compressed air fed to that primary heat exchanger stage may be varied by the controller 75 operating the valve 80, to enable a desired supply of pre-compressed and partially cooled air to be fed to the second compressor stage 16. The controller may too operate the equalisation valve 59a in the by-pass loop 59b and thus receive an input from the sensor 58.

To vary the amount of pre-compression and overall compression of the recycled air, the motors 15a, 16a which drive the compressor wheels 15, 16 may be driven at varying speeds by the controller 75.

Thus the system 10 may be controlled to operate to provide stable conditions i.e. temperature of the two heat loads 11, 12 over widely varying operational and prevailing conditions.

Various modifications are possible without departing from the scope of the invention. For example the heat load to be cooled may be only one of or an alternative to a first heat load generated by avionics/radar equipment 11 or other electrical apparatus and a second heat load of an aircrew enclosure 12. Such a cooling system may be used for un-manned aircraft to cool electrically operated apparatus, or for any other cooling purpose.

The partially closed loop system 10 so far described allows the introduction into the system 10, of a volume of fresh (auxiliary) air to make-up for air lost from exhaust 19. For an un-manned aircraft, such fresh air e.g. for breathing in an aircrew enclosure 12 would not be required and accordingly the system 10 may be a completely closed loop system. In this case, to provide coolant for the primary heat exchanger 18, the heat exchanger would need to be positioned, e.g. as described above, in a ram air duct e.g. adjacent the secondary heat exchanger 32.

Instead of being a closed or partially closed loop system 10, the system 10 may be an open loop system, for example as described with reference to FIGS. 2 and 2a below.

In FIG. 2, similar parts to those indicated in FIG. 1 are indicated by the same reference numerals.

In this embodiment, a supply of ambient air 70 is drawn into the compressor 14 which again has first and second compressor stages, each compressor stage including a compressor wheel 15, 16 driven by a respective motor 15a, 16a.

The air is cooled between the first and second compressor stages in a primary heat exchanger 18, before being fed to a secondary heat exchanger 32, and hence to an expansion apparatus 30.

The coolant for the primary heat exchanger 18 is again air which has been used to cool the heat load, but in this open loop embodiment, all of the air which has been utilised for cooling, is discharged via exhaust 19 to atmosphere, with none of it being recycled.

In this example, it can be seen that the heat load includes in parallel, not only avionics/radar equipment 11 and an aircrew enclosure 12, but also a liquid heat load 45a, although the liquid heat load is pre-cooled in a liquid heat load heat exchanger 45 which is in series with the other heat loads 11, 12, 45a.

In FIG. 2a, there is shown a modified compressor 14, in which a single motor 14a is provided to drive the compressor wheels 15, 16 of both compressor stages, the wheels 15, 16 being carried on a single driven shaft 14b. Again though the air which is compressed and heated in the first compressor stage by the first compressor wheel 15, is cooled in a primary heat exchanger 18 before being compressed further by the second compressor wheel 16 of the second compressor stage.

The single motor 14a arrangement described with reference to FIG. 2a may be applied in the embodiment of FIG. 1 if desired.

What is Claimed is:

1. An air cycle cooling system for cooling a first heat load and a second heat load, the system including compressor means to pressurize air in the system, and an expansion apparatus for allowing the compressed air to expand and cool for use in cooling the first and second heat loads, and wherein at least a proportion of the air utilized for cooling the first heat load is recycled to the compressor means and at least a proportion of the air utilized for cooling the second heat load is utilized as a coolant in a primary heat exchanger to cool the air from the first heat load prior to the air from the first heat load being expanded in the expansion apparatus.

2. A system according to claim 1 wherein the compressor means includes first and second compressor stages, each compressor stage including a compressor wheel and the primary heat exchanger is positioned between the first and second compressor stages so that the air from the first heat load which is cooled by the air from the second heat load is pre-compressed by the first compressor stage.

3. A system according to claim 2 wherein the compressor wheels are driven by a common electric motor and the compressor wheels are carried on a common drive shaft.

4. A system according to claim 3 wherein energy recovered from the pressurized air supply in the expansion apparatus is utilized to provide power to drive at least one of the electric motor or motors for driving the compressor means.

5. A system according to claim 4 wherein the energy recovered from the pressurized air supply in the expansion apparatus drives a power generator for driving the compressor means.

6. A system according to claim 2 wherein individual electric motors are provided for driving the compressor wheels of the first and second compressor stages.

7. A system according to claim 1 wherein the system includes a fan for assisting cooling of the pressurized air prior to feeding the pressurized air to the expansion apparatus.

8. A system according to claim 1 wherein the cooling system is an at least partially closed loop system in which at least some of the air which has been utilized for cooling at least the first heat load is subsequently recycled to the compressor means for pressurization, and an auxiliary pressurized air supply is provided to make up air lost from the system.

9. A system according to claim 8 wherein the auxiliary pressurized air is pre-cooled prior to mixing with pressurized air from the compressor means in a pre-cooling heat exchanger, in which the auxiliary air is pre-cooled by exchanging heat with a coolant being air.

10. A system according to claim 8 wherein the auxiliary air and the pressurized recycled air from the compressor means are mixed and cooled prior to expansion and cooling in the expansion apparatus in a secondary heat exchanger.

11. A system according to claim 10 wherein heat in the auxiliary and recycled air is exchanged with a coolant in the secondary heat exchanger, such coolant including air which is induced to flow through the secondary heat exchanger.

12. A system according to claim 1 wherein the air cycle cooling system in use, provides cooling of first and second heat loads in an aircraft.

13. A system according claim 12 wherein the first heat load is produced by an electrically operated apparatus in an aircraft and the second heat load is produced in an aircrew or passenger enclosure.

14. A system according to claim 13 wherein a hot air supply is available to the aircrew or passenger enclosure when heating of the enclosure is required, the hot air supply being provided from the compressor means.

15. A system according to claim 1 wherein a water separator is provided to separate water from the air expanded and cooled in the expansion apparatus.

16. A system according to claim 15 wherein water separated from the air expanded and cooled in the expansion apparatus is utilized for assisting cooling of the pressurized air prior to expansion and cooling in the expansion apparatus.

* * * * *

UNITED STATES PATENT AND TRADEMARK OFFICE
CERTIFICATE OF CORRECTION

PATENT NO.    : 6,658,873 B2
DATED         : December 9, 2003
INVENTOR(S)   : John Alistair Clarke and Bernard Francis Sampson It is certified that error appears in the above-identified patent and that said Letters Patent is hereby corrected as shown below:

<u>Title page,</u>
Item [75], please correct the second inventors last name to
-- Bernard Francis Sampson --; and please correct both of the Inventors' City to
-- Yeovil, (GB) --

Signed and Sealed this

Twenty-third Day of March, 2004

JON W. DUDAS
*Acting Director of the United States Patent and Trademark Office*